United States Patent [19]

Kinoshita et al.

[11] Patent Number: 5,290,869
[45] Date of Patent: Mar. 1, 1994

[54] CEMENT DISPERSION AGENTS

[75] Inventors: Mitsuo Kinoshita; Yoshimasa Miura; Tsuneo Yamamoto, all of Aichi, Japan

[73] Assignee: Takemoto Yushi Kabushiki Kaisha, Aichi, Japan

[21] Appl. No.: 991,283

[22] Filed: Dec. 16, 1992

[30] Foreign Application Priority Data

Dec. 21, 1991 [JP] Japan .................................. 3-355903

[51] Int. Cl.$^5$ ...................... C08F 265/04; C04B 16/04
[52] U.S. Cl. .................................... 525/291; 525/296; 525/303; 525/308; 524/3
[58] Field of Search ............... 525/291, 296, 303, 308; 524/3

[56] References Cited

U.S. PATENT DOCUMENTS 4,962,173 10/1990 Kinoshita et al. ..................... 528/32
5,180,760 1/1993 Oshibe et al. ......................... 525/296

Primary Examiner—Vasu S. Jagannathan
Attorney, Agent, or Firm—Heller, Ehrman, White & McAuliffe

[57] ABSTRACT

Cement dispersion agents containing a graft copolymer composed of four kinds of constituent unit each having a specified structure can provide improved fluidity to cementing compositions, prevent slump loss after the kneading process and reduce the drying shrinkage of hardened concrete produced at the same time.

6 Claims, No Drawings

CEMENT DISPERSION AGENTS

BACKGROUND OF THE INVENTION

This invention relates to cement dispersion agents. Cement dispersion agents are used for cementing compositions such as mortar and concrete in order to provide them with fluidity and water reducing property. The present invention relates in particular to such cement dispersion agents that are capable of providing high fluidity to cementing compositions, restraining the change in fluidity such as slump loss with the passage of time after kneading, and reducing the drying shrinkage of hardened concrete which is obtained at the same time.

Although many kinds of natural and synthetic cement dispersion agents have been in use, most of them can provide only low fluidity to cementing compositions and their slump losses are large. There were proposals to use water-soluble vinyl copolymers as cement dispersion agent (Japanese Patent Publications Tokkai 62-78137 and Tokkai 1-226757, U.S. Pat. Nos. 4,962,173, 4,960,465 and 5,028,271). Although they can provide relatively high fluidity to cementing compositions and their slump losses are relatively small, their effects are still insufficient. In particular, they are not satisfactory in that the drying shrinkage of hardened concrete which is obtained is large and shrinkage cracks are formed in such hardened concrete as a result.

SUMMARY OF THE INVENTION

The problems to be solved by the present invention are that prior art cement dispersion agents cannot provide high fluidity to cementing compositions, that their slump losses are large and, in particular, that the drying shrinkage of hardened concrete that is obtained is large.

The present inventors discovered, as a result of their diligent research in order to find solutions to the problems described above, that suitable cement dispersion agents can be obtained if use is made of a graft copolymer composed of four specified kinds of constituent units.

DETAILED DESCRIPTION OF THE INVENTION

This invention relates to cement dispersion agents characterized as containing a graft copolymer comprised of first constituent unit shown by Formula (1) given below, second constituent unit shown by Formula (2) given below, third constituent unit shown by Formula (3) given below and fourth constituent unit shown by Formula (4) given below:

$$\begin{array}{c} R^1 \\ | \\ \text{\textlparen}CH_2-C\text{\textrparen} \\ | \\ COOM^1 \end{array} \quad \text{(Formula (1))}$$

(Formula (2))

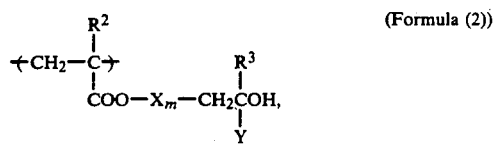

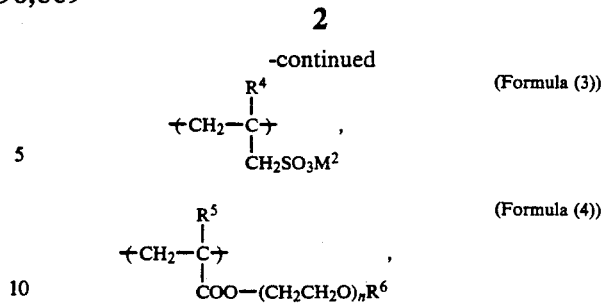

where $R^1$–$R^5$ are each H or $CH_3$; $R^6$ is an alkyl group with 1–5 carbon atoms; $M^1$ and $M^2$ are each alkali metal, alkali earth metal or organic amine; X is $CH_2CH_2O$, $CH_2CH(CH_3)O$ or $CH_2$; Y is a polymer block obtained by radical polymerization of $\alpha, \beta$-ethylenically unsaturated monomers having an amide group in the molecule; m is 0 or an integer 1–10; and n is 0 or an integer 1–50.

Examples of monomer, from which constituent unit shown by Formula (1) (hereinafter referred to as Unit A) can be formed, include salts of alkali metals such as lithium, sodium and potassium (meth)acrylates; salts of alkali earth metals such as calcium and magnesium (meth)acrylates; and organic amines such as diethanolamine and triethanolamine (meth)acrylates.

Examples of monomer, from which constituent unit shown by Formula (2) (hereinafter referred to as Unit B) can be formed, include alkanediol mono(meth)acrylates and polyalkyleneglycol mono(meth)acrylates. Examples of such alkanediol mono(meth)acrylate include 2-hydroxyethyl (meth)acrylate, 2-hydroxypropyl (meth)acrylate, 1,4-butanediol mono(meth)acrylate and 1,6-hexanediol mono(meth)acrylate. Examples of such polyalkyleneglycol mono(meth)acrylate include polyethyleneglycol mono(meth)acrylate, polypropyleneglycol mono(meth)acrylate and poly(ethylene/propylene)glycol mono(meth)acrylate. Of the above, however, 2-hydroxyethyl methacrylate and polyethyleneglycol (molar number n of added ethylene oxide =2–10) monomethacrylate are preferred.

Examples of $\alpha, \beta$-ethylenically unsaturated monomer having an amide group in the molecule necessary for forming a polymer block of Unit B include (meth)acrylamide; N-alkyl-substituted (meth)acrylamides such as N-methyl (meth)acrylamide, N,N-dimethyl (meth)acrylamide and N-t-butyl (meth)acrylamide; N-substituted (meth)acrylamides such as N-methoxymethyl (meth)acrylamide, N-ethoxyethyl (meth)acrylamide, N-butoxymethyl (meth)acrylamide, N-hydroxyethyl (meth)acrylamide and N-methylol (meth)acrylamide; (meth)acrylamide sulfonates such as (meth)acrylamidemethane sulfonic acid and its salts, (meth)acrylamideethane sulfonic acid and its salts and 2-(meth)acrylamide-2-methylpropane sulfonic acid and its salts; N-vinylamides such as N-vinyl formamide, N-methyl, N-vinyl formamide, N-vinylacetoamide and N-methyl, N-vinylacetoamide; and vinyl substituted lactums such as N-vinyl-2-pyrolidone, N-vinyl-5-methylpyrolidone, N-vinyl-5-butylpyrolidone, N-ethyl-3-vinylpyrolidone and N-ethyl-5-vinylpyrolidone. Of the above, however, (meth)acrylamide, 2-(meth)acrylamide-2- (methylpropane sulfonic acid and salts thereof are preferred.

Examples of monomer, from which constituent unit shown by Formula (3) (hereinafter referred to as Unit C) can be formed, include alkali metal salts such as lithium, sodium and potassium (meth)allylsulfonates;

alkali earth salts such as calcium and magnesium (meth)allylsulfonates; and organic amine salts such as diethanolamine salts and triethanolamine salts of (meth)allylsulfonic acid.

Examples of monomer, from which constituent unit shown by Formula (4) (hereinafter referred to as Unit D) can be formed, include alkoxypolyethyleneglycol (meth)acrylates with 1–5 carbon atoms and alkyl (meth)acrylates with 1–5 carbon atoms. Examples of such alkoxypolyethyleneglycol (meth)acrylate include esters of alkoxypolyethyleneglycol such as methoxypolyethyleneglycol, ethoxypolyethyleneglycol, (iso)propoxypolyethyleneglycol and butoxypolyethyleneglycol and (meth)acrylic acid. Examples of alkyl (meth)acrylate include methyl (meth)acrylate, ethyl (meth)acrylate, (iso)propyl (meth)acrylate and butyl (meth)acrylate. Of the above, however, alkoxypolyethyleneglycol (meth)acrylate and methyl acrylate are preferred.

Graft copolymers according to the present invention are composed of Units A–D as explained above. Although the ratios by which Units A–D are to be contained are not particularly limited, it is preferable that the ratios (Unit A)/(Unit B)/(Unit C)/(Unit D) be in the range of (40–80)/(1–30)/(1–20)/(5–50) in molar %, and more preferably in the range of (50–75)/(3–25)/(3–25)/(5–30). Of Units A–D, Unit B is particularly important because the desired effects of the present invention can be obtained by introducing Unit B having polymer block Y into the graft copolymer. From the point of view of obtaining desired effects, it is desirable that the weight ratio (polymer block)/(graft copolymer) be in the range of 1/100–200/100.

Next, a method of producing graft copolymers of the present invention will be explained. Although graft copolymers of the present invention can be obtained by a conventional copolymerization reaction of monomers of aforementioned kinds which form Units A–D and hence the present invention does not impose any special limitation, it is desirable to preliminarily obtain copolymers by copolymerizing the monomers except polymer block Y and then to carry out graft copolymerization of $\alpha,\beta$-ethylenically unsaturated monomers having an amide group in the molecule for forming polymer block Y to these copolymers. As for the method of polymerization, aqueous solution polymerization by using water or a mixture of water and water-soluble organic solvent is preferable.

As for radical initiators which may be used for the copolymerization reaction or the graft polymerization reaction to copolymers, there is no particular limitation as long as they are decomposed under the copolymerization and graft polymerization reaction temperatures to generate radicals, but it is preferable to use a water-soluble radical initiator. Examples of such radical initiator include persulfates such as potassium persulfate and ammonium persulfate, hydrogen peroxide and 2,2'-azobis(2-amidinopropane)dihydrochloride. They can also be used as a redox initiator by combining with a reducing agent such as sulfites and L-ascorbic acid. Use may also be made of secondary cerium salt catalyst as a strong oxidizing agent such as cerium (IV) diammonium nitrate and cerium (IV) diammonium sulfate. In the graft polymerization reaction for combining polymer block Y to a copolymer, in particular, it is advantageous to use secondary cerium salt catalyst as a strong oxidizing agent for the purpose of obtaining a high yield in graft polymerization reaction.

An example of method for producing graft copolymer of the present invention will be explained next. First, each monomer other than polymer block Y is dissolved in water to obtain a aqueous solution containing these monomers by 10–45 weight % as their total. A radical initiator is added to obtain copolymer by a copolymerization reaction in a nitrogen gas atmosphere at 50°–70° C. for 4–6 hours. Next, the copolymer thus obtained and $\alpha,\beta$-ethylenically unsaturated monomers having an amide group in the molecule are dissolved in water to obtain an aqueous solution and after the atmosphere of the reaction liquid is replaced with nitrogen, a radical initiator is added for a graft polymerization reaction at 40°–70° C. for 3–6 hours to obtain a graft copolymer. The desirable average numerical molecular weight of the copolymer exclusive of polymer block Y which corresponds to the precursor of the graft copolymer is 2,000–20,000 (pullulan converted by GPC method). Of the graft copolymers obtained by combining polymer block Y to it by a graft polymerization reaction, those with reduced viscosity (20° C.) of 0.5–1.0% as a 1% solution using 1N salt water as solvent are preferred, and those with reduced viscosity 0.10–0.8 are even more preferable.

Cement dispersion agents according to the present invention comprises graft copolymers as explained above, but they can be used in combination with other agents, depending of the purpose of use. Examples of such agent include air entraining agents, antifoaming agents, accelerators, retarders, rust inhibitors, antiseptic agents, water repellents and reinforcing agents. They may be added together with water when cementing composition is being prepared by kneading or after the kneading of cementing composition has been finished. Cement dispersion agents of the present invention are usually used at a rate of 0.01–2.0 weight %, or preferably 0.05–1.0 weight %, as solid component with respect to cement. If this rate is too small, dispersion fluidity becomes too low and the effects of preventing slump loss and reducing the drying shrinkage also both tend to become weak. If too much is used, on the other hand, setting retardation becomes too great, affecting the hardening process adversely, and the separation of material are caused, tending to make it difficult to obtain uniformly hardened concrete.

Cement dispersion agents of the present invention can be applied to mortar and concrete produced by using many kinds of portland cement, fly ash cement, portland blast furnace slag cement, portland pozzalan cement and blended cement of many kinds. In order to more clearly explain the present invention, examples of use will be described below but the scope of the invention is not intended to be limited by these examples.

EXPERIMENTS

Part 1: Production of Graft Copolymers

Graft copolymer samples G-1 to G-10 were produced as described below and summarized in Tables 1 and 2.

Production of Graft Copolymer Sample G-1

Placed inside a reaction vessel were 66 weight parts of methacrylic acid, 19 weight parts of hydroxyethyl methacrylate, 22 weight parts of sodium methallylsulfonate, 273 weight parts of methoxypolyethyleneglycol (molar number n of ethylene oxide addition=23) monomethacrylate and 500 weight parts of water. Into this was added 64 weight parts of 48% (hereinafter indicating weight %) aqueous solution of sodium hydroxide for neutralization and after the solution became uniform, the atmosphere was replaced with nitrogen. Polymerization was started by adding 50 weight parts of 15% aqueous solution of ammonium persulfate while the temperature of the reaction system was maintained at 60° C. by means of a warm bath. The polymerization reaction was continued for 5 hours to obtain a copolymer of average numerical molecular weight (hereinafter always pullulan converted by GPC method)=7,000.

Placed into another reaction vessel were 300 weight parts of the copolymer thus obtained, 350 weight parts of water and 80 weight parts of acrylamide and the atmosphere was replaced with nitrogen after a uniform solution was obtained. While the temperature of the reacting system was maintained at 55° C. by means of a warm bath, 20 weight parts of cerium (IV) diammonium nitrate solution (cerium (IV) ion of 1/10 mol in 1N nitric acid aq.) was added for a graft polymerization reaction. After the product was condensed by means of an evaporator, it was refined by retention inside a mixed solvent of acetone/ethyl acetate and dried to obtain graft copolymer G-1.

It was found by analyzing graft copolymer G-1 that it had carboxyl value of 62, nitrogen content of 8.9%, sulfur content of 8.9%, and reduced viscosity (in 1N NaCl aqueous solution of concentration 1% and temperature 20° C.) of 0.35. From this analysis, it could be ascertained that graft copolymer G-1 is composed of copolymer before graft polymerization structured as (sodium methacrylate)/(2-hydroxyethyl methacrylate)/(sodium methallylsulfonate)/(methoxypolyethyleneglycol (molar number n of ethylene oxide addition=23) monomethacrylate)=60/12/10/18 (in molar ratio) linking with polyacrylamide as polymer block at the rate of (polyacrylamide)/(copolymer before graft polymerization)=82/100 (in weight ratio). Graft copolymer samples G-2 through G-10 were similarly obtained.

TABLE 1

Composition of copolymer before graft polymerization (molar %)

| Sample | Unit A | | | Unit B | | | Unit C | | Unit D | |
|---|---|---|---|---|---|---|---|---|---|---|
| | a | b | c | d | e | f | g | h | i | j | k |
| G-1 | 60 | | 12 | | | | 10 | | 18 | | |
| G-2 | 60 | | 12 | | | | 10 | | 18 | | |
| G-3 | 60 | | 12 | | | | 10 | | 18 | | |
| G-4 | 65 | | | | 5 | | 15 | | 15 | | |
| G-5 | 60 | | | | 5 | | 10 | | | 25 | |
| G-6 | 60 | | 10 | | | | 10 | | 10 | | 10 |
| G-7 | | 50 | 25 | | | | | 10 | | 15 | |
| G-8 | | 60 | | | 5 | 17 | | 18 | | | |
| G-9 | | 70 | | 10 | | | 3 | | | 17 | |
| G-10 | 75 | | | | | 10 | 8 | | | | 7 |

TABLE 2

| Sample | Molecular Weight *1 | Composition of Grafted Polymer Block (molar %) | | | Weight Ratio | *2 |
|---|---|---|---|---|---|---|
| | | p | q | r | | |
| G-1 | 6000 | 100 | | | 82/100 | 0.25 |
| G-2 | 6000 | 100 | | | 25/100 | 0.20 |
| G-3 | 6000 | 100 | | | 150/100 | 0.60 |
| G-4 | 4000 | 100 | | | 43/100 | 0.18 |
| G-5 | 7000 | | 100 | | 43/100 | 0.30 |
| G-6 | 7000 | 50 | | 50 | 83/100 | 0.26 |
| G-7 | 12000 | 100 | | | 25/100 | 0.47 |
| G-8 | 2500 | | 100 | | 186/100 | 0.75 |
| G-9 | 18000 | | | 100 | 11/100 | 0.38 |

TABLE 2-continued

| Sample | Molecular Weight *1 | Composition of Grafted Polymer Block (molar %) | | | Weight Ratio | *2 |
|---|---|---|---|---|---|---|
| | | p | q | r | | |
| G-10 | 8000 | | 100 | | 43/100 | 0.33 |

In Tables 1 and 2:
Unit B: Corresponding to the situation where Y in Formula (2) is H;
*1: Molecular weight of precursor before graft polymerization;
Weight Ratio: (Grafted polymer block Y)/(precursor before graft polymerization);
*2: Reduced viscosity of graft copolymer at 1% concentration with 1N salt water as solvent;
a: Sodium methacrylate;
b: Sodium acrylate;
c: 2-hydroxyethyl methacrylate;
d: Poly(n = 9)ethyleneglycol monomethacrylate;
e: Hydroxypropyl methacrylate;
f: 1,4-butanediol monomethacrylate;
g: Sodium methallylsulfonate;
h: Sodium allylsulfonate;
i: Methoxypolyethyleneglycol(n = 23) methacrylate;
j: Methoxypolyethyleneglycol(n = 9) methacrylate;
k: Methyl acrylate;
p: Acrylamide;
q: Methacrylamide;
r: Sodium 2-acrylamide-2-methylpropanesulfonic acid Part 2: Concrete Tests Concrete samples were produced as described below, and slump, air content, bleeding water volume, setting time, compressive strength and drying shrinkage ratio were measured on each as follows. The results are summarized in Tables 3 and 4.

Composition

Composition was as follows: Ordinary portland cement (equal-part mixture of ordinary portland cement from Onoda Cement Kabushiki Kaisha and ordinary portland cement from Sumitomo Cement Kabushiki Kaisha) 300 kg/m$^3$; fine aggregate (fine sand of specific weight 2.62 and fineness modulus 2.61) 883 kg/m$^3$; coarse aggregate (crushed stone of specific weight 2.65) 951 kg/m$^3$ (sand-coarse aggregate ratio=47%); and water content per unit volume of concrete 169 kg/m$^3$ (water-to-cement ratio=56%). In all examples, a cement dispersion agent was added within the range of 0.6 or less by solid component with respect to cement such that the target value of slump would be 18 cm. Air content was adjusted by using an air entraining agent with all samples such that the target air content would be 4-6%.

Procedure

Cement dispersion agents were used as a part of kneading water and the total material (35 liters to be kneaded) with the composition as given above was placed inside a 60-liter tilting mixer for kneading at 28 r.p.m. for 3 minutes to produce a uniform mixture. A sample was taken immediately after the kneading to measure its slump and air content under the condition of 20° C. and 80% RH. The kneading was further continued at 2 r.p.m. for 60-90 minutes and another sample was taken to have its slump and air content measured. Also measured were the bleeding water volume and setting time at 20° C. from the concrete sample immediately after the kneading, the compressive strength from a 28-day old sample, and the drying shrinkage ratios from 28-day old and 91-day old samples. The measurements of slump, air content, bleeding water volume, setting time, compressive strength and drying shrinkage ratio were conducted respectively according to JIS-A1101, JIS-A1128, JIS-A1123, JIS-A6204, JIS-A1108 and JIS-A1129 (JIS=Japanese Industrial Standards).

As clearly demonstrated above, the present invention has the effect of providing high fluidity to cementing compositions, preventing slump loss after the kneading process and reducing the drying shrinkage of hardened concrete produced at the same time.

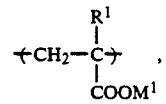

(Formula (1))

TABLE 3

| Example | Cement Dispersion Agent Kind | Dosage (wt %) | Immediately After Slump (cm) | Immediately After Air Content (%) | After 60 minutes Slump (cm) | After 60 minutes Air Content (%) | After 90 minutes Slump (cm) | After 90 minutes Air Content (%) |
|---|---|---|---|---|---|---|---|---|
| Test Examples: | | | | | | | | |
| 1 | G-1 | 0.13 | 18.8 | 4.7 | 18.5 | 4.5 | 18.0 | 4.3 |
| 2 | G-2 | 0.12 | 18.6 | 4.5 | 17.8 | 4.2 | 17.2 | 4.2 |
| 3 | G-3 | 0.25 | 19.0 | 4.3 | 18.1 | 4.0 | 17.7 | 3.8 |
| 4 | G-4 | 0.12 | 18.5 | 4.8 | 17.9 | 4.3 | 17.6 | 4.1 |
| 5 | G-5 | 0.20 | 18.3 | 4.6 | 17.2 | 4.4 | 16.7 | 3.9 |
| 6 | G-6 | 0.14 | 18.9 | 4.5 | 18.5 | 4.5 | 18.3 | 4.4 |
| 7 | G-7 | 0.25 | 18.0 | 4.0 | 17.0 | 4.5 | 16.8 | 4.4 |
| 8 | G-8 | 0.21 | 18.5 | 4.9 | 18.1 | 4.7 | 17.9 | 4.5 |
| 9 | G-9 | 0.23 | 18.6 | 4.6 | 17.7 | 4.5 | 17.1 | 4.2 |
| 10 | G-10 | 0.29 | 18.9 | 4.7 | 16.9 | 4.3 | 16.6 | 4.0 |
| Comparison Examples: | | | | | | | | |
| 1 | R-1 | 0.14 | 18.4 | 4.6 | 16.1 | 4.1 | 14.5 | 3.8 |
| 2 | R-2 | 0.19 | 18.8 | 4.8 | 15.5 | 4.3 | 14.0 | 4.0 |
| 3 | R-3 | 0.32 | 18.7 | 4.8 | 10.1 | 4.1 | 8.2 | 3.7 |
| 4 | R-4 | 0.37 | 18.3 | 4.5 | 12.5 | 4.2 | 10.0 | 3.9 |
| 5 | *3 | *4 | 18.6 | 4.2 | 12.7 | 4.0 | 9.7 | 3.6 |

TABLE 4

| Example | Slump ratio (%) | Bleeding water volume (cm³/cm²) | Setting time (min) *5 | Setting time (min) *6 | Compressive strength (kgf/cm²) | Dry shrinkage ratio ($\times 10^{-4}$) 28 days | Dry shrinkage ratio ($\times 10^{-4}$) 91 days |
|---|---|---|---|---|---|---|---|
| Test Examples: | | | | | | | |
| 1 | 96 | 0.08 | 430 | 540 | 371 | 2.82 | 4.85 |
| 2 | 92 | 0.21 | 420 | 515 | 378 | 3.20 | 5.73 |
| 3 | 93 | 0.03 | 480 | 600 | 355 | 2.60 | 4.56 |
| 4 | 95 | 0.15 | 410 | 510 | 380 | 3.05 | 5.60 |
| 5 | 91 | 0.13 | 470 | 585 | 375 | 3.10 | 5.75 |
| 6 | 97 | 0.05 | 415 | 530 | 383 | 2.76 | 4.80 |
| 7 | 90 | 0.28 | 450 | 570 | 359 | 3.50 | 5.92 |
| 8 | 97 | 0.03 | 440 | 585 | 367 | 2.68 | 4.70 |
| 9 | 92 | 0.30 | 435 | 550 | 365 | 3.60 | 5.99 |
| 10 | 88 | 0.23 | 495 | 610 | 358 | 3.40 | 5.88 |
| Comparison Examples: | | | | | | | |
| 1 | 79 | 0.45 | 420 | 525 | 370 | 5.23 | 8.22 |
| 2 | 74 | 0.56 | 440 | 590 | 365 | 5.01 | 8.05 |
| 3 | 44 | 0.40 | 405 | 500 | 372 | 5.83 | 8.91 |
| 4 | 55 | 0.49 | 510 | 660 | 353 | 6.02 | 9.15 |
| 5 | 52 | 0.38 | 525 | 680 | 358 | 4.83 | 6.72 |

In Tables 3 and 4:
Dosage: By solid component with respect to cement;
Slump ratio: ((Slump after 90 minutes)/(slump immediately after kneading)) × 100;
G-1 to G-10: As defined in Part 1;
R-1: Copolymer comprising (sodium methacrylate)/(2-hydroxyethyl methacrylate)/(sodium methallylsulfonate)/(methoxypolyethyleneglycol (n = 23) methacrylate) = 60/12/10/18 (in molar ratio) with average numerical molecular weight 6000;
R-2: Copolymer comprising (sodium methacrylate)/(polyethyleneglycol(n = 9)monomethacrylate)/(sodium methallylsulfonate)/(methoxypolyethyleneglycol(n = 9) methacrylate) = 60/5/10/25 (in molar ratio) with average numerical molecular weight 7000;
R-3: Condensation product of naphthalene sulfonic acid and formaldehyde;
R-4: Lignin sulfonate;
*3: R-4/methoxypolyethyleneglycol (n = 3);
*4: 0.38/1.50;
*5: Initial;
*6: Final

What is claimed is:

1. A cement dispersion agent containing a graft copolymer comprising first constituent unit shown by Formula (1) given below, second constituent unit shown by Formula (2) given below, third constituent unit shown by Formula (3) given below and fourth constituent unit shown by Formula (4) given below:

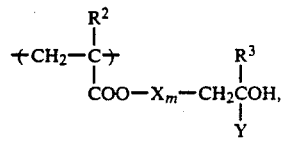

(Formula (2))

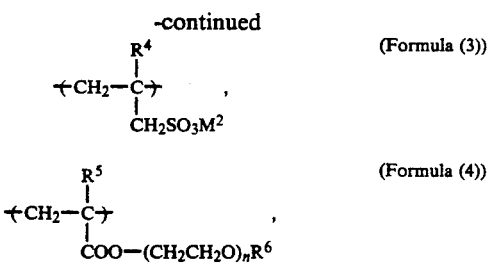

where $R^1$-$R^5$ are each H or $CH_3$; $R^6$ is an alkyl group with 1-5 carbon atoms; $M^1$ and $M^2$ are each alkali metal, alkali earth metal or organic amine; X is $CH_2CH_2O$, $CH_2CH(CH_3)O$ or $CH_2$; Y is a polymer block obtained by radical polymerization of α, β-ethylenically unsaturated monomers having an amide group in the molecule; m is 0 or an integer 1-10; and n is 0 or an integer 1-50.

2. The cement dispersion agent of claim 1 wherein said Y in said Formula (2) is a polymer block obtained by radical polymerization of (meth)acrylamide.

3. The cement dispersion agent of claim 2 wherein said graft copolymer contains said first constituent unit shown by said Formula (1) by 40-80 molar %, said second constituent unit shown by said Formula (2) by 1-30 molar %, said third constituent unit shown by said Formula (3) by 1-20 molar %, and said fourth constituent unit shown by said Formula (4) by 5-30 molar %.

4. The cement dispersion agent of claim 1 wherein said Y in said Formula (2) is a polymer block obtained by radical polymerization of one or more monomers selected from the group consisting of 2-(meth)acrylamide-2-methylpropanesulfonic acid and salt thereof.

5. The cement dispersion agent of claim 4 wherein said graft copolymer contains said first constituent unit shown by said Formula (1) by 40-80 molar %, said second constituent unit shown by said Formula (2) by 1-30 molar %, said third constituent unit shown by said Formula (3) by 1-20 molar %, and said fourth constituent unit shown by said Formula (4) by 5-30 molar %.

6. The cement dispersion agent of claim 1 wherein said graft copolymer contains said first constituent unit shown by said Formula (1) by 40-80 molar %, said second constituent unit shown by said Formula (2) by 1-30 molar %, said third constituent unit shown by said Formula (3) by 1-20 molar %, and said fourth constituent unit shown by said Formula (4) by 5-30 molar %.

* * * * *